(12) United States Patent
Li et al.

(10) Patent No.: US 11,363,092 B2
(45) Date of Patent: Jun. 14, 2022

(54) RESOURCE SHARING METHOD, DEVICE AND SYSTEM

(71) Applicant: ZTE CORPORATION, Guangdong (CN)

(72) Inventors: Kai Li, Shenzhen (CN); Song Shen, Shenzhen (CN); Haijun Qiu, Shenzhen (CN); Yimo Song, Shenzhen (CN)

(73) Assignee: ZTE Corporation, Guangdong (CN)

( * ) Notice: Subject to any disclaimer, the term of this patent is extended or adjusted under 35 U.S.C. 154(b) by 428 days.

(21) Appl. No.: 16/465,394

(22) PCT Filed: Nov. 27, 2017

(86) PCT No.: PCT/CN2017/113143
§ 371 (c)(1),
(2) Date: May 30, 2019

(87) PCT Pub. No.: WO2018/099350
PCT Pub. Date: Jun. 7, 2018

(65) Prior Publication Data
US 2020/0007612 A1    Jan. 2, 2020

(30) Foreign Application Priority Data

Nov. 30, 2016    (CN) .......................... 201611089137.4

(51) Int. Cl.
*H04L 67/08* (2022.01)
*H04L 67/1042* (2022.01)
*H04L 67/1074* (2022.01)
*H04L 67/1087* (2022.01)
*H04L 67/104* (2022.01)

(52) U.S. Cl.
CPC .......... *H04L 67/08* (2013.01); *H04L 67/1044* (2013.01); *H04L 67/1076* (2013.01); *H04L 67/1089* (2013.01)

(58) Field of Classification Search
USPC ......................................... 709/203
See application file for complete search history.

(56) References Cited

U.S. PATENT DOCUMENTS

2011/0231840 A1    9/2011   Burch et al.
2014/0068007 A1    3/2014   O'Gorman
(Continued)

FOREIGN PATENT DOCUMENTS

CN    103650458 A    3/2014
CN    104156647 A    11/2014
(Continued)

OTHER PUBLICATIONS

Extended European Search Report issued in application No. 17876567.3 dated Jun. 29, 2020.
(Continued)

*Primary Examiner* — Hermon Asres
(74) *Attorney, Agent, or Firm* — Knobbe, Martens, Olson & Bear, LLP

(57) ABSTRACT

Provided are a resource sharing method, device and system. The method includes: establishing, by a cloud desktop system based on a virtual desktop infrastructure (VDI), links with multiple terminals; and acquiring, by the cloud desktop system, resources of the multiple terminals through the links, and sharing the acquired resources to the multiple terminals.

14 Claims, 13 Drawing Sheets

A cloud desktop system based on a virtual desktop infrastructure (VDI) establishes links with multiple terminals — S102

The cloud desktop system acquires resources of the multiple terminals through the links, and shares the acquired resources to the multiple terminals — S104

(56) References Cited

U.S. PATENT DOCUMENTS

| | | | |
|---|---|---|---|
| 2014/0108775 A1* | 4/2014 | Kludy | G06F 9/45558 |
| | | | 713/2 |
| 2014/0366096 A1 | 12/2014 | Burch et al. | |
| 2015/0081796 A1 | 3/2015 | Xu et al. | |
| 2016/0286003 A1* | 9/2016 | Pessis | G06F 9/541 |
| 2016/0352738 A1 | 12/2016 | Burch et al. | |
| 2016/0378782 A1 | 12/2016 | Jiang et al. | |
| 2017/0019498 A1* | 1/2017 | Ng | H04L 63/105 |

FOREIGN PATENT DOCUMENTS

| | | |
|---|---|---|
| CN | 204795119 U | 11/2015 |
| CN | 105681424 A | 6/2016 |
| EP | 2922273 A1 | 9/2015 |
| GN | 103812915 A | 5/2014 |
| GN | 106161501 A | 11/2016 |
| JP | 2007-193429 A | 8/2007 |
| KR | 10-1674618 B1 | 11/2016 |

OTHER PUBLICATIONS

Office Action issued in Japanese application No. 2019-529154 dated Jul. 21, 2020.
International Search Report of PCT Application No. PCT/CN2017/113143, which is parent—4 pages (dated Feb. 26, 2018).
Office Action of corresponding Chinese Patent Application No. 201611089137.4-5 pages (dated Apr. 1, 2020).
Office Action of corresponding Korean Patent Application No. 10-2019-7018848—11 pages (dated May 22, 2020).
Kwon, "High-Performance VDI Protocol Technology Trends", Weekly Technology Trend, vol. 1546—47 pages (May 16, 2012).

* cited by examiner

RESOURCE SHARING METHOD, DEVICE AND SYSTEM

CROSS-REFERENCE TO RELATED APPLICATIONS

This is a National Stage Application, filed under 35 U.S.C. 371, of International Patent Application No. PCT/CN2017/113143, filed on Nov. 27, 2017, which claims priority to Chinese patent application No. 201611089137.4 filed on Nov. 30, 2016, contents of both of which are incorporated herein by reference in their entireties.

TECHNICAL FIELD

The present disclosure relates to the field of communications and specifically to a resource sharing method, device and system.

BACKGROUND

In the current desktop virtualization technology, a virtual desktop infrastructure (VDI) has been adopted by the vast number of manufacturers as a mainstream desktop virtualization technology. Nowadays, with the increasing demand for cloud computing technology, many manufacturers have launched their own VDI virtual desktop.

In the coming era of VDI technology, terminals have decreasing cost and enriching types. Different terminals are applicable to different scenarios according to their own characteristics and performance. The terminals owned by each person, no matter an enterprise user or an individual user, are also increasing in terms of type and number. However, in a specific scenario, the user can only use one terminal or use resources of one terminal. When the user has a special project file or task to process, the user needs to change to another terminal in a conventional manner. Nevertheless, the another terminal is commonly a VDI virtual desktop or a thin terminal operating the VDI virtual desktop, and is incapable of performing advanced image processing, which means that the user should switch to a high-performance personal computer (PC) to complete the processing. It can be seen that in the related art, when the current terminal cannot process a file or task, the user needs to change to another terminal to complete the processing.

SUMMARY

Embodiments of the present disclosure provide a resource sharing method, device and system.

According to an aspect of the present disclosure, a resource sharing method is provided. The method includes: establishing, by a cloud desktop system based on a virtual desktop infrastructure (VDI), links with multiple terminals; and acquiring, by the cloud desktop system, resources of the multiple terminals through the links, and sharing the acquired resources to the multiple terminals.

According to another aspect of the present disclosure, a resource sharing method is provided. The method includes: establishing, by a terminal, a link with a cloud desktop system based on a virtual desktop infrastructure (VDI); reporting, by the terminal, resources to the cloud desktop system through the link; and receiving, by the terminal, resources shared from the cloud desktop system, where the shared resources comprise all resources reported by multiple terminals.

According to another aspect of the present disclosure, a cloud desktop system is provided. The cloud desktop system includes: a processor, a memory configured to store instructions executable by the processor, and a transmission apparatus configured to perform information transceiving communication according to control of the processor; where the processor controls the transmission apparatus to establish links with multiple terminals; and acquires resources of the multiple terminals through the transmission apparatus, and shares the acquired resources to the multiple terminals.

According to another aspect of the present disclosure, a resource sharing device is provided. The device is applied to a terminal and includes: a second establishment module configured to establish a link with a cloud desktop system based on a virtual desktop infrastructure (VDI); a reporting module configured to report resources to the cloud desktop system through the link; and a receiving module configured to receive resources shared by the cloud desktop system, where the shared resources include all resources reported by multiple terminals.

According to another aspect of the present disclosure, a terminal is provided. The terminal includes: a processor, a memory configured to store instructions executable by the processor, and a transmission apparatus configured to perform information transceiving communication according to control of the processor; where the processor is configured to establish a link with a cloud desktop system based on a virtual desktop infrastructure (VDI) through the transmission apparatus; and report to the cloud desktop system and receive resources shared from the cloud desktop system through the transmission apparatus, where the shared resources include all resources reported by multiple terminals.

According to another aspect of the present disclosure, a resource sharing system is provided. The system includes the device applied to the cloud desktop system described above and the device applied to the terminal described above.

According to another embodiment of the present disclosure, a storage medium is further provided. The storage medium is configured to store program codes for executing the following steps: establishing links with multiple terminals; acquiring, by a cloud desktop system, resources of the multiple terminals through the links, and sharing the acquired resources to the multiple terminals.

Through embodiments of the present disclosure, the cloud desktop system may establish the links with the multiple terminals, and acquire the resources of the multiple terminals and share the acquired resources to the multiple terminals, thereby implementing resource sharing among the multiple terminals. In other words, one terminal may implement using resources of other terminals. In this way, when the current terminal cannot process a file or task, the user needs to move to another terminal to complete the processing. The effect of user experience is thus improved.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It should be noted that the terms "first", "second" and the like in the description, claims and drawings of the present disclosure are used to distinguish between similar objects and are not necessarily used to describe a particular order or sequence.

Embodiment One

Figure 1:
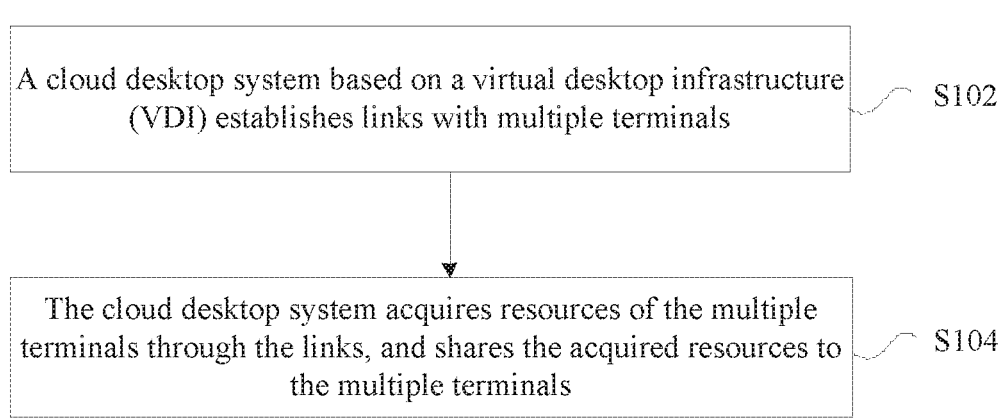
FIG. 1 is a flowchart 1 of a resource sharing method according to an embodiment of the present disclosure.

FIG. 1 is a flowchart one of a resource sharing method according to an embodiment of the present disclosure. As shown in FIG. 1, the method includes steps described below.

In step S102, a cloud desktop system based on a virtual desktop infrastructure (VDI) establishes links with multiple terminals.

In step S104, the cloud desktop system acquires resources of the multiple terminals through the links, and shares the acquired resources to the multiple terminals.

Through the steps S102 and S104 in this embodiment, the cloud desktop system may establish the links with the multiple terminals, and acquire the resources of the multiple terminals and share the acquired resources to the multiple terminals, thereby implementing resource sharing among the multiple terminals. In other words, one terminal may implement using resources of other terminals. In this way, when the current terminal cannot process a file or task, the user needs to move to another terminal to complete the processing. The effect of user experience is thus improved.

The step S102 of this embodiment in which the cloud desktop system establishes the links with multiple terminals may be implemented in the manner described below.

In step S102-1, the cloud desktop system receives login requests transmitted by the multiple terminals through respective cloud desktop clients.

In step S102-2, after the multiple terminals log into the cloud desktop system through the cloud desktop clients, the cloud desktop system establishes the links between the cloud desktop system and the multiple terminals.

It is to be noted that in an implementation mode of this embodiment, the login requests carry identification information of the terminals. Based on this, after the cloud desktop system receives the login requests transmitted by the multiple terminals through the cloud desktop clients, the method of this embodiment may further include that the cloud desktop system groups the multiple terminals according to the identification information.

In an implementation mode of this embodiment, the identification information may correspond to user home of the terminal. For example, a terminal A, a terminal B, and a terminal C all belongs to a user 1, i.e., the terminals A to C belong to one group. In addition, the identification information may also correspond to a terminal type. For example, the terminals A to C are all computers, i.e., the terminals A to C belong to one group. Of course, the illustration herein is merely used as an example.

Based on the grouping described above, the step S102-2 of this embodiment in which the cloud desktop system establishes the links between the cloud desktop system and the multiple terminals may be implemented in a manner in which the cloud desktop system establishes the links with the grouped terminals according to the login requests.

In another implementation mode of this embodiment, the step S104 in which the cloud desktop system acquires the resources of the multiple terminals through the links, and shares the acquired resources to the multiple terminals may be implemented in the manner described below.

In step S104-1, the cloud desktop system receives resources reported by the multiple grouped terminals through the links.

In step S104-2, the cloud desktop system shares resources received from each terminal group to terminals in the each terminal group, or shares the received resources to all terminals.

It is to be noted that the resources in this embodiment include: peripheral device resources and application resources. The peripheral device resources may include a USB device, a mouse, a printer, a camera, etc.

In a case where the resources are the peripheral device resources of the terminals, the step S104 in which the cloud desktop system acquires the resources of the multiple terminals through the links, and shares the acquired resources to the multiple terminals may be implemented in the manner described below.

In step S104-3, the cloud desktop system receives the peripheral device resources reported by the multiple terminals through the links.

In step S104-4, the cloud desktop system determines whether the peripheral device resources are allowed to be shared.

In step S104-5, in a case where the peripheral device resources are allowed to be shared, the cloud desktop system shares the peripheral device resources to the cloud desktop clients of the multiple terminals.

In step S104-6, the cloud desktop system redirects the peripheral device resources shared to the cloud desktop clients of the multiple terminals.

In step S104-7, the cloud desktop system loads the redirected peripheral device resources into the cloud desktop system.

In a case where the resources are the application resources of the terminals, the step S104 in which the cloud desktop system shares the acquired resources to the multiple terminals may be implemented in the manner described below.

In step S104-8, the cloud desktop system determines whether a currently operated terminal is a native terminal of currently operated application resources.

In step S104-9, in response to determining that the currently operated terminal is the native terminal of the currently operated application resources, the cloud desktop system triggers the native terminal of the currently operated application resources to operate the currently operated application resources and return an operation on the currently operated application resources for display; and/or in step S104-10, the cloud desktop system acquires data of the application resources and/or a program executing the application resources from the native terminal, delivers the acquired data or program to a terminal currently operated, and triggers the terminal currently operated according to the data or the program to operate the application resources currently operated.

In another implementation mode of this embodiment, after the acquired resources are shared to the multiple terminals, the method in this embodiment may further include the steps described below.

In step S106, the cloud desktop system configures a public cloud desktop, and shares the public cloud desktop to the multiple terminals.

In step S108, the cloud desktop system selects a terminal from the multiple terminals, authorizes the selected terminal to operate the public desktop, and forbids the rest of the multiple terminals to operate the public cloud desktop.

In another implementation mode of this embodiment, after the acquired resources are shared to the multiple terminals, the method in this embodiment may further include the steps described below.

In step S110, the cloud desktop system selects a terminal as a public cloud desktop from the multiple terminals.

In step S112, the cloud desktop system configures the public cloud desktop to be a terminal shared by the rest of the multiple terminals.

Embodiment Two

Figure 2:
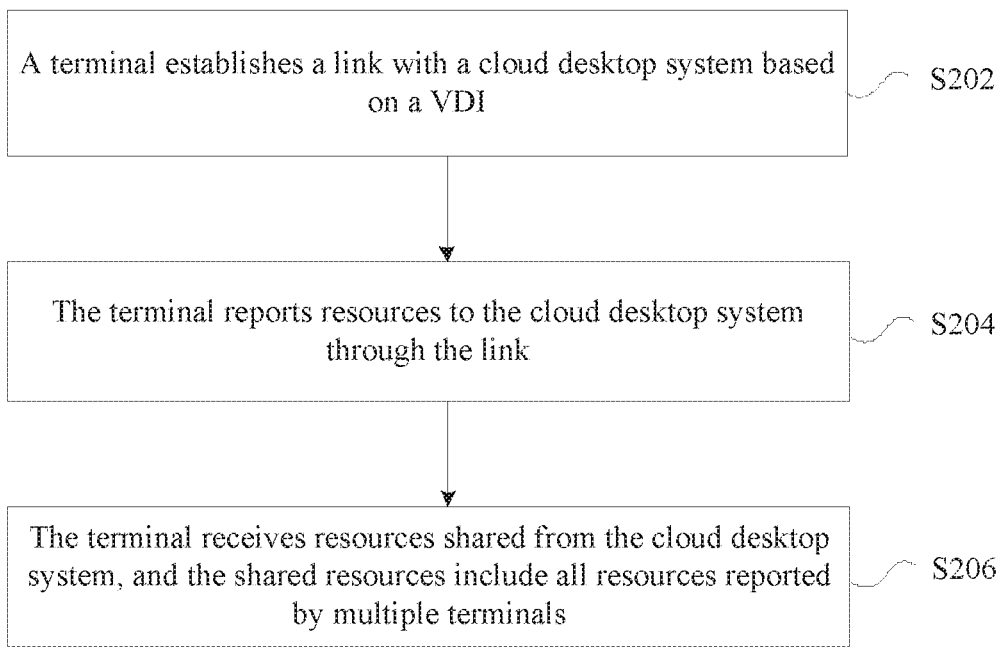
FIG. 2 is a flowchart 2 of a resource sharing method according to an embodiment of the present disclosure.

FIG. 2 is a flowchart two of a resource sharing method according to an embodiment of the present disclosure. As shown in FIG. 2, the method includes steps described below.

In step S202, a terminal establishes a link with a cloud desktop system based on a VDI.

In step S204, the terminal reports resources to the cloud desktop system through the link.

In step S206, the terminal receives resources shared from the cloud desktop system, and the shared resources include all resources reported by multiple terminals.

In an optional implementation mode of this embodiment, the step S202 in which the terminal establishes the link with the cloud desktop system based on the VDI may be implemented in the manner described below.

In step S202-1, the terminal transmits a login request to the cloud desktop system through a cloud desktop client on the terminal.

In step S202-2, after the terminal logs into the cloud desktop system through the cloud desktop client, the terminal establishes the link with the cloud desktop system.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to embodiments of the present disclosure.

Embodiment Three

This embodiment further provides a resource sharing device for implementing the above-mentioned embodiments. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 3:
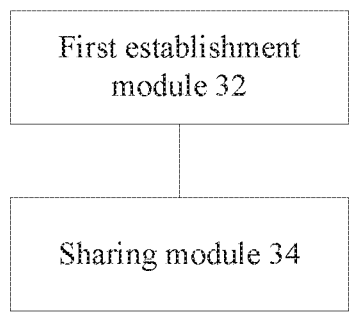
FIG. 3 is a block diagram 1 of a resource sharing device according to an embodiment of the present disclosure.

FIG. 3 is a block diagram 1 of a resource sharing device according to an embodiment of the present disclosure. The device is applied to a cloud desktop system side based on a VDI. As shown in FIG. 3, the device includes: a first establishment module 32 configured to establish links with multiple terminals; a sharing module 34 coupled to the first establishment module 32 and configured to acquire resources of the multiple terminals through the links and share the acquired resources to the multiple terminals.

In an embodiment, the first establishment module 32 includes: a first receiving unit configured to receive login requests transmitted by the multiple terminals through cloud desktop clients; a first establishment unit configured to establish the links between the cloud desktop system and the multiple terminals after the multiple terminals log into the cloud desktop system through the cloud desktop clients.

In an embodiment, the login requests carry identification information of the terminals. Based on this, the device may further include: a grouping module coupled to the first establishment module 32 and configured to group the multiple terminals according to the identification information after the first receiving unit receives the login requests transmitted by the multiple terminals through the cloud desktop clients. The first establishment unit is further configured to establish the links with the grouped terminals according to the login requests.

In an embodiment, the sharing module 34 includes: a second receiving unit configured to receive resources reported by the grouped terminals through the links; a first sharing unit coupled to the second receiving unit and configured to share resources received from each terminal group to terminals in the each terminal group, or share the received resources to all terminals.

In an embodiment, in a case where the resources are peripheral device resources of the terminals, the sharing module 34 further includes: a third receiving unit configured to receive the peripheral device resources reported by the terminals through the links; a determination unit configured to determine whether the peripheral device resources are allowed to be shared; a second sharing unit configured to, in a case where the peripheral device resources are allowed to be shared, share the peripheral device resources to the cloud desktop clients of multiple terminals; a redirection unit configured to redirect the peripheral device resources shared to the cloud desktop clients of the multiple terminals; and a mounting unit configured to mount the redirected peripheral device resources onto the cloud desktop system.

In an embodiment, in a case where the resources are application resources of the terminals, the sharing module 34 includes:

a judgment unit configured to determine whether a currently operated terminal is a native terminal of currently operated application resources; and a first triggering unit coupled to the judgment unit and configured to, in response to determining that the currently operated terminal is the native terminal of currently operated application resources, trigger the native terminal of the currently operated application resources to operate the currently operated application resources and return an operation on the currently operated application resources for display; and/or an acquisition unit is coupled to the judgment unit and configured to acquire data of the application resources and/or a program executing the application resources from the native terminal; a delivery unit configured to deliver the acquired data and/or program to a terminal currently operated; and a triggering unit coupled to the delivery unit and configured to trigger the terminal currently operated according to the data and/or the program to operate the application resources currently operated.

In an embodiment, the device may further include: a first configuration module coupled to the sharing module 34 and configured to, after sharing the acquired resources to the multiple terminals, configure and share the public cloud desktop to the multiple terminals; and a first selection module coupled to the first configuration module and configured to select a terminal from the multiple terminals, authorize the selected terminal to operate the public desktop, and forbid the rest of the multiple terminals to operate the public cloud desktop.

In an embodiment, the device may further include: a second selection module coupled to the sharing module 34 and configured to, after sharing the acquired resources to the multiple terminals, select a terminal to be a public cloud desktop; and a second configuration module coupled to the second selection module and configured to configure the public cloud desktop to be a terminal shared by the rest of the multiple terminals.

The resource sharing device described above is applied to a cloud desktop system side. Therefore, this embodiment further provides a cloud desktop system. The system includes: a processor; a memory configured to store instructions executable by the processor; and a transmission apparatus configured to perform information transceiving communication according to control of the processor. The processor controls the transmission apparatus to establish links with multiple terminals; and acquires resources of the multiple terminals through the transmission apparatus, and shares the acquired resources to the multiple terminals.

In an embodiment, the processor is further configured to receive login requests transmitted by cloud desktop clients of the multiple terminals through the transmission apparatus; and after the multiple terminals log into the cloud desktop system through the cloud desktop clients, establish links between the cloud desktop system and the multiple terminals.

In an embodiment, in a case where the resources are the peripheral device resources of the terminals, the processor is further configured to receive the peripheral device resources reported by the multiple terminals through the transmission apparatus, determine whether the peripheral device resources are allowed to be shared, and in response to determining that the peripheral device resources are allowed to be shared, share the peripheral device resources to cloud desktop clients of the plurality of terminals; the processor is further configured to redirect the peripheral device resources shared to the cloud desktop clients of the multiple terminals, and mount the redirected peripheral device resources onto the cloud desktop system.

In an embodiment, in a case where the resources are the application resources of the terminals, the processor is further configured to determine whether a currently operated terminal is a native terminal of currently operated application resources, trigger, in response to determine that the currently operated terminal is the native terminal of the currently operated application resources, through the transmission apparatus, the native terminal of the currently operated application resources to operate the currently operated application resources and return an operation on the currently operated application resources for display; and/or acquire data of the application resources and/or a program executing the application resources from the native terminal, deliver the acquired data and/or program to a terminal currently operated, trigger the terminal currently operated according to the data and/or the program to operate the application resources currently operated.

Embodiment Four

Figure 4:
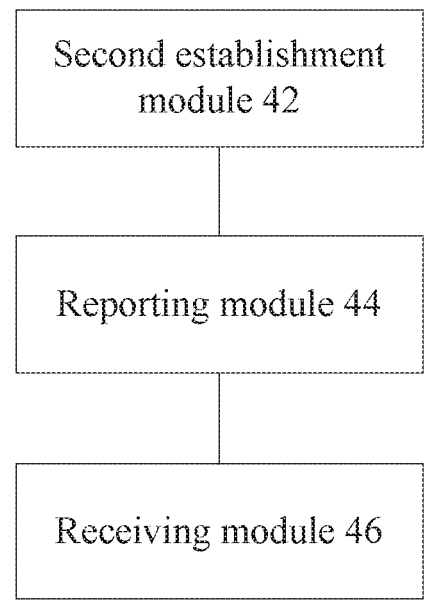
FIG. 4 is a block diagram 2 of a resource sharing device according to an embodiment of the present disclosure.

FIG. 4 is a block diagram 2 of a resource sharing device according to an embodiment of the present disclosure. The device is applied to a terminal side. As shown in FIG. 4, the device includes: a second establishment module 42 configured to establish a link with a cloud desktop system based on a virtual desktop infrastructure (VDI); a reporting module 44 coupled to the second establishment module 42 and configured to report resources to the cloud desktop system through the link; and a receiving module 46 coupled to the reporting module and configured to receive resources shared by the cloud desktop system, where the shared resources include all resources reported by multiple terminals.

In an embodiment, the second establishment module includes: a transmission unit configured to transmit a login request to the cloud desktop system through a cloud desktop client on the terminal; and a second establishment unit configured to establish a link with the cloud desktop system after the terminals log into the cloud desktop system through the cloud desktop clients.

Based on the resource sharing device, the present disclosure further provides a terminal. The terminal includes a processor; a memory configured to store instructions executable by the processor; and a transmission apparatus configured to perform information transceiving communication according to control of the processor. The processor is configured to establish a link with a cloud desktop system based on a virtual desktop infrastructure (VDI) through the transmission apparatus, and report to the cloud desktop system and receive resources shared from the cloud desktop system through the transmission apparatus, where the shared resources include all resources reported by multiple terminals.

In an embodiment, the processor is further configured to transmit a login request to a cloud desktop system through the transmission apparatus; and after the terminal logs into the cloud desktop system through the cloud desktop client, establish the link with the cloud desktop system.

The present embodiment provides a resource sharing system. The system includes the resource sharing device in the embodiment three and the resource sharing device in the embodiment four.

The embodiments of the present disclosure in specific application scenarios are described below.

Embodiment Five

Through the embodiment, interconnection and resource sharing of various terminals such as a virtual desktop, a PC, a mobile terminal and the like under a same user name may be implemented. The user is led by a VDI virtual desktop, and practicability and usability of an office mode constructed by the user are greatly improved.

This embodiment provides a user desktop interconnection and resource sharing method based on a cloud desktop technology. The method includes steps described below.

In step S302, the virtual desktop, PC and mobile terminal under the same user name are interconnected under the premise that enterprise-level and user-level information security is guaranteed, and each terminal may issue peripherals and applications as resource sharing for the user to use inside a cloud desktop system.

In step S304, terminal peripheral resources in an interconnection terminal group are shared.

The user accesses to the cloud desktop system through any terminal, a shared peripheral device issued by each terminal may be seen in a peripheral device list of a cloud desktop client of the terminal, and the user may redirect and mount the shared peripheral device to the cloud desktop system for use as needed.

In step S306, terminal application resources in the interconnection terminal groups are shared.

The user accesses the cloud desktop system through any terminal, and a shared application issued by each terminal may be seen in an application list of the cloud desktop client. In an optional embodiment of this embodiment, the application resources may be shared in two manners: (1) the shared application operates on a native terminal; (2) a shared application interface is displayed on a desktop side, and human-machine interaction data is processed by the native terminal of the shared application and then is received and displayed.

In step S308, a virtual desktop task may be selectively sunken to a current terminal side for completion.

In step S310, public resources are rationally utilized.

A same public desktop supports may be connected by multiple persons, and is under master control of a Master user while other users receiving operation display. A public terminal may belong to multiple interconnection terminal groups. Master users of multiple interconnection terminal groups use the resource sharing of the public terminal in turn under a certain rule.

The step S302 involved in the above method may be implemented in the manner described below.

According to a characteristic that the VDI virtual desktop is able to be logged in from various types of terminals such as the PC and the mobile terminal, when the user installs a client in any terminal and logs in, terminal information is carried in a login request and transmitted to a cloud platform management side to be matched. If the user owns the terminal is owned or is authorized to use the terminal, the terminal is added in an interconnection terminal group under a user name. In the interconnection terminal group, the user cloud desktop plays a role of Master and all terminals play a role of Slave. When the terminal is in a turned-on state, an agent module in the client keeps operating and reports the state to a server. The user may check the state of each terminal in the interconnection terminal group through a client interface in the cloud desktop when the user visits the cloud desktop at any terminal.

The step S302 is described below in conjunction with drawings.

Figure 5:
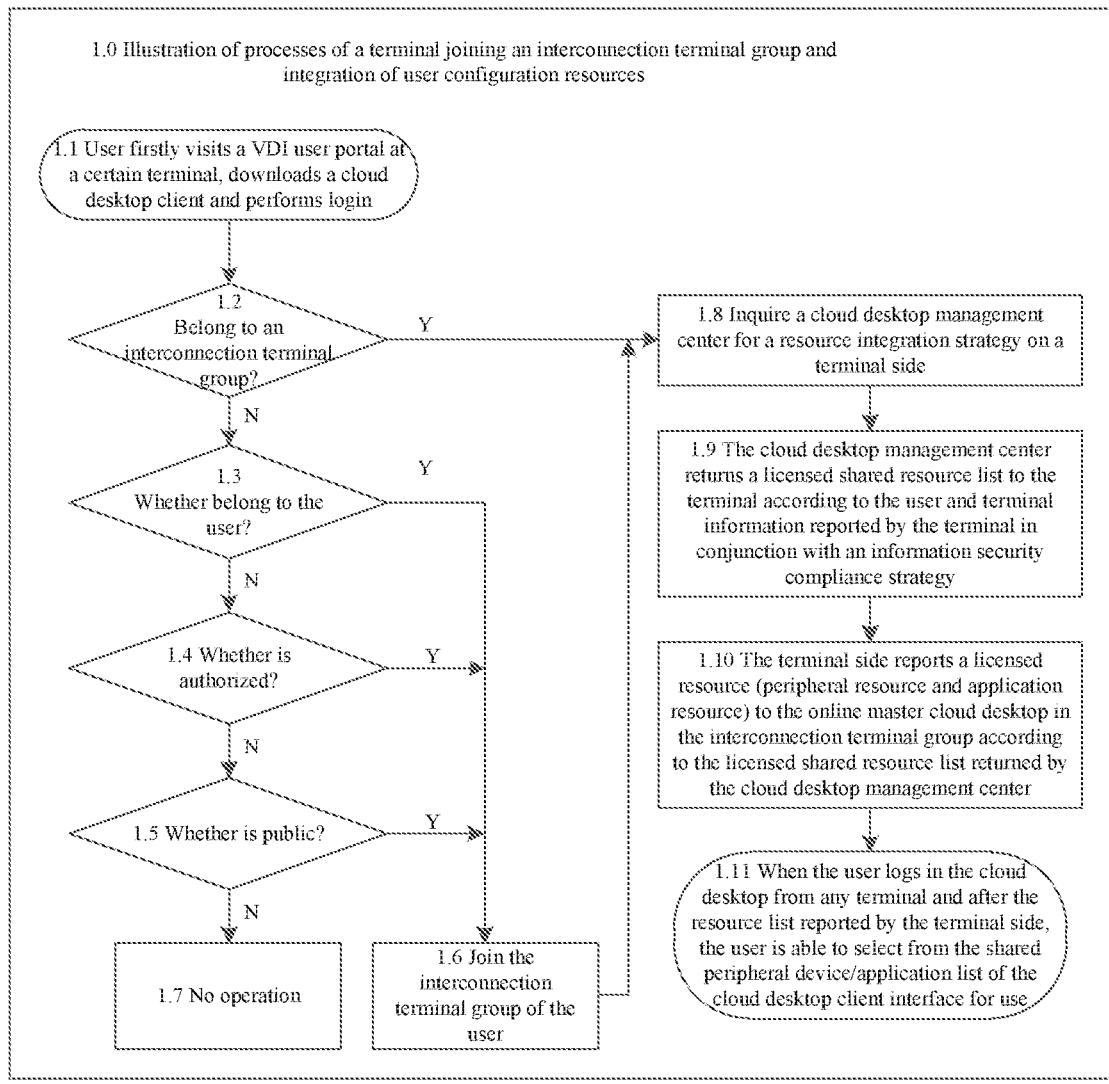
FIG. 5 is a flowchart of a process of a terminal joining an interconnection terminal group according to an embodiment of the present disclosure.
Figure 6:
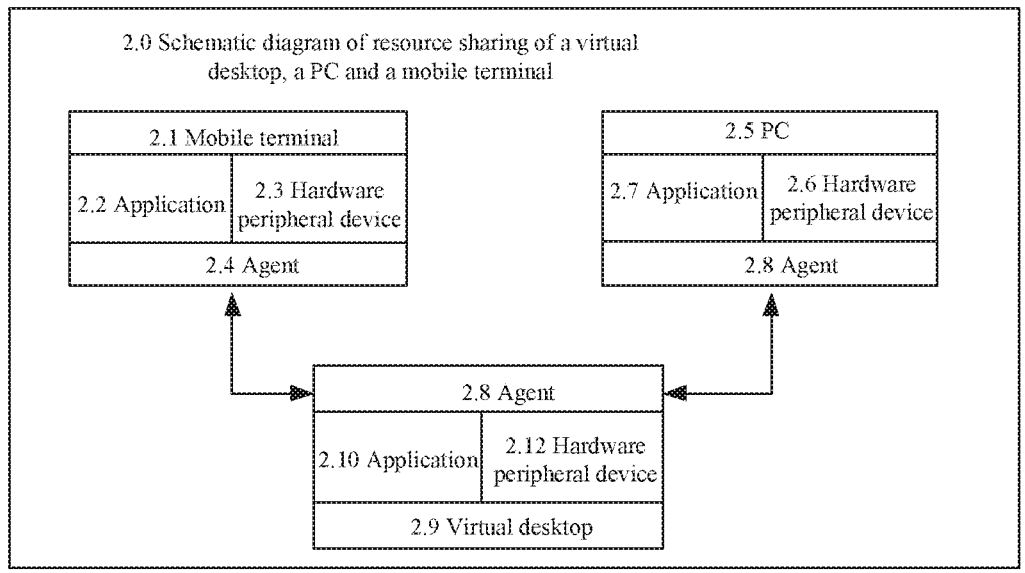
FIG. 6 is a schematic diagram of resource sharing of a virtual desktop, a PC and a mobile terminal according to an embodiment of the present disclosure.

FIG. 5 is a flowchart of a process of a terminal joining an interconnection terminal group according to an embodiment of the present disclosure. FIG. 6 is a schematic diagram of resource sharing of a virtual desktop, a PC and a mobile terminal according to an embodiment of the present disclosure. As shown in FIGS. 5 and 6, after joining the interconnection terminal group, the terminal (Slave) deletes and selects information of local peripheral devices and applications according to a preset strategy and reports to an online user cloud desktop (Master). The preset strategy includes strategies of such as a user, a terminal and a system (which includes but is not limited to information security compliance requirements). After resources are reported, the user is able to find the peripheral devices and the applications reported by the terminal (Slave) through the client interface in the cloud desktop (Master) and use the peripheral devices and the applications (the specific use mode will be described in detail in the following steps). After the use, the resources may be released on the cloud desktop (Master) side. There are two optional release modes: active release after the use; and automatic release in case of timeout without being used. The user may also directly log in the terminal (Slave) to recycle the resources. If multiple cloud desktops are in the interconnection terminal group of the user, if a peripheral device or an application of a terminal is redirected by a certain cloud desktop, the remaining cloud desktops cannot perform redirection operation until the capability is released.

It is to be noted that in FIG. 5, the module 1.1 represents that a user firstly visits a VDI user portal at a certain terminal, downloads the cloud desktop client and performs login.

The module 1.2 is configured to determine whether the terminal belongs to the interconnection terminal group.

The module 1.3 is configured to determine whether the terminal belongs to the user.

The module 1.4 is configured to determine whether the user is authorized to use the terminal.

The module 1.5 is configured to determine whether the terminal is public.

The module 1.6 is configured to join the interconnection terminal group of the user.

The module 1.7 is configured to perform no operation if the current terminal does not comply with the requirements.

The module 1.8 is configured to inquire a cloud desktop management center for a resource integration strategy on a terminal side.

The module 1.9 is configured to return a licensed shared resource list to the terminal according to the user and terminal information reported by the terminal in conjunction with an information security compliance strategy.

The module 1.10 is configured to report a licensed resource (peripheral resource and application resource) to the online master cloud desktop in the interconnection terminal group according to the licensed shared resource list returned by the cloud desktop management center.

The module 1.11 is configured to, when the user logs in the cloud desktop from any terminal and after the resource list reported by the terminal is received, enable the user to select from the shared peripheral device/application list of the cloud desktop client interface for use.

It should be noted that among the modules in FIG. 6, the module 2.1 is a mobile terminal; the module 2.2 is an application operated on the mobile terminal; the module 2.3 is a hardware peripheral device of the mobile terminal; the module 2.4 is an interconnection agent operated on the mobile terminal side and is configured to provide an interface for reporting state to the server, sharing the peripheral device and the application; the module 2.5 is a PC terminal; the module 2.6 is a hardware peripheral device of the PC terminal; the module 2.7 is an applications operated on the PC terminal; the module 2.8 is an interconnection agent operated on a PC terminal side and is configured to provide an interface for reporting a state to the server, sharing the peripheral device and the application; the module 2.9 is a virtual desktop; the module 2.10 is an application operated on the virtual desktop; the module 2.11 is an interconnection agent operated by the virtual desktop and is configured to provide an interface for reporting the state to the server, sharing the peripheral device and the application; the module 2.12 is a terminal peripheral device used by the user for logging in the virtual desktop.

The step S304 involved in the above method may be implemented in the manner described below.

After the peripheral resources of the terminal (Slave) are integrated, the user will find information about the peripheral devices in the shared peripheral device list of the Master client interface.

Figure 7:
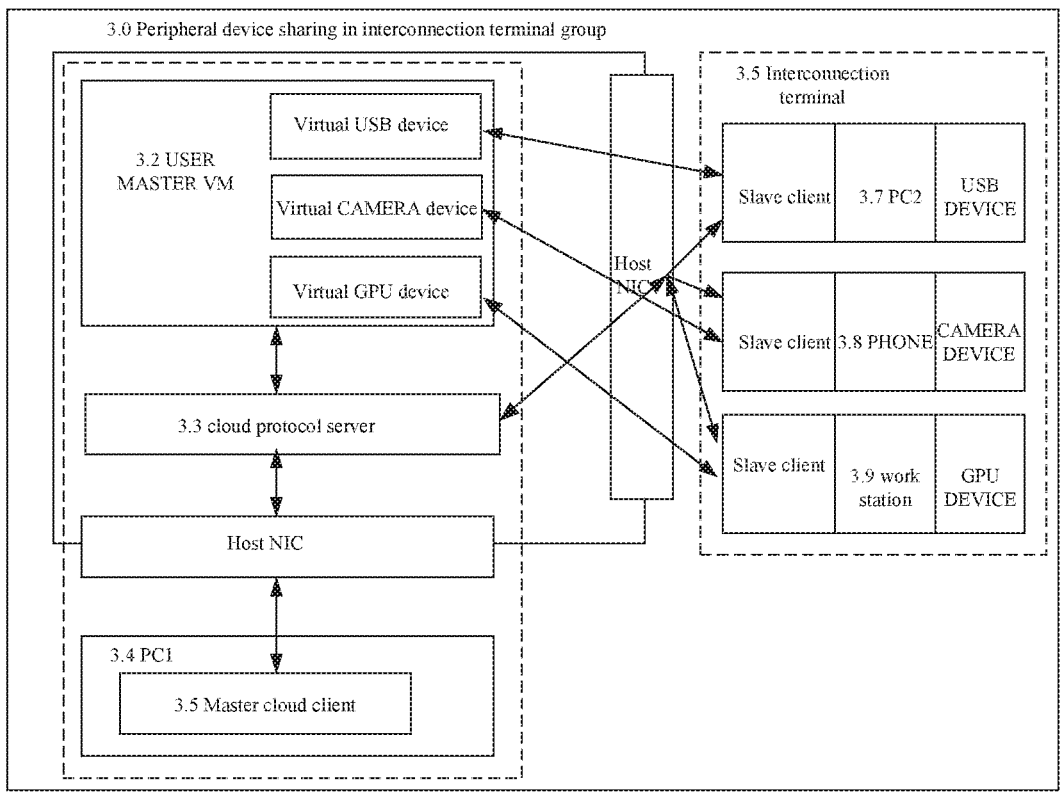
FIG. 7 is a schematic diagram of principle of sharing a peripheral device between terminals in an interconnection terminal group according to an embodiment of the present disclosure.

FIG. 7 is a schematic diagram of principle of sharing a peripheral device between terminals in an interconnection terminal group according to an embodiment of the present disclosure. As shown in FIG. 7, three peripheral devices, i.e., a USB, a camera and a graphics card, are respectively shared on a PC2, a phone and a workstation according to the terminal characteristics. After visiting the cloud desktop on the PC1, the user may perform the redirection operation on the three peripheral devices in the shared peripheral device list, and mount the peripheral devices on the desktop for use.

It is to be noted that among the modules in FIG. 7, the module 3.1 is a host operating the user cloud desktop (Slave); the module 3.2 is a desktop virtual machine; the module 3.3 is a cloud protocol serving end; the module 3.4 is a PC used by the user logging in the cloud desktop; the module 3.5 is a cloud protocol client; the module 3.6 is various terminals in the interconnection terminal group; the module 3.7 is a PC2 providing a shared peripheral USB device; the module 3.8 is a phone providing a shared peripheral camera device; and the module 3.9 is the workstation providing a shared peripheral GPU device.

Figure 8:
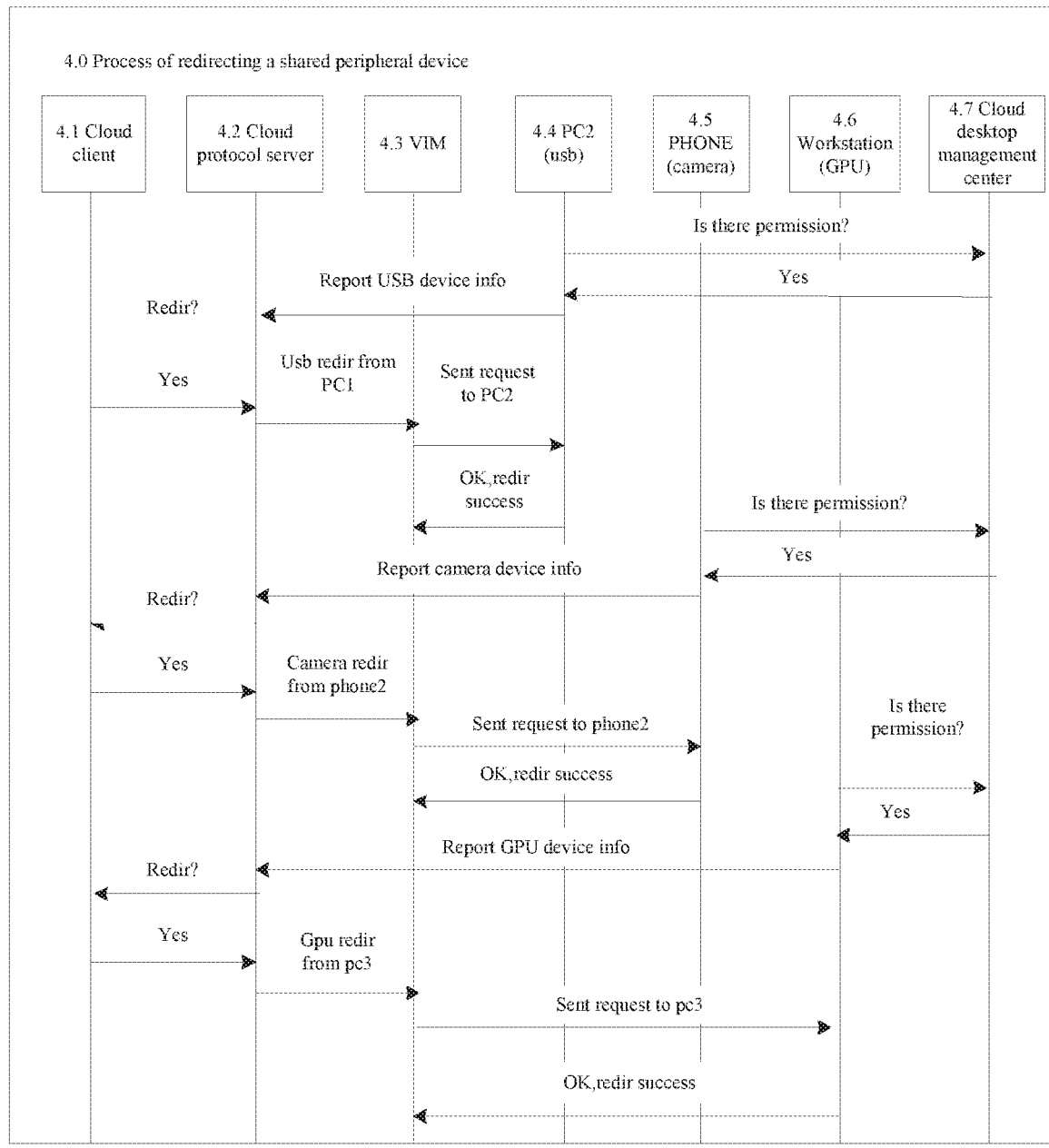
FIG. 8 is a flowchart of a process of redirecting a shared peripheral device according to an embodiment of the present disclosure.

FIG. 8 is a flowchart of a process of redirecting a shared peripheral device according to an embodiment of the present disclosure. As shown in FIG. 8, based on a process of reporting the resources to the cloud desktop (Master) when the terminal (Slave) is turned on in FIG. 5, if new hardware is inserted after the terminal (Slave) is turned on, the terminal (Slave) needs to request the cloud desktop management center to confirm authority in real time and re-report to the cloud desktop (Master).

The redirection process is illustrated by taking the USB redirection as an example. When a PC2 4.4 detects that the USB device is inserted and the USB device is configured to be a shared peripheral device, the PC2 starts from a perspective of information security, then inquiries the cloud platform management center for a current strategy to determine whether the USB device is allowed to be shared. If the cloud desktop management center returns OK, the USB device is allowed to be shared. A PC2 side agent transmits a report to the cloud protocol serving end according to information of currently visiting the cloud desktop by the user and informs the cloud protocol serving end that a USB peripheral is inserted. A toolbar in the user cloud protocol client prompts the user whether to perform redirection. If the user selects redirection, the cloud desktop (Master) agent transmits a link establishment request to the PC2 side agent. The PC2 responds with OK to indicate redirection success. After the redirection is completed, the user may read and write the USB peripheral device on the PC2 in the cloud desktop.

Similarly, the user redirects a Phone2 camera 4.5, and the mobile phone camera may be used as a network camera. If the phone is left, the microphone and headset of the phone may be redirected to complete the call remotely, which is very convenient and expands the application range of the cloud desktop.

If the peripheral device of the terminal (Slave) is redirected by the cloud desktop (Master), the user will receive a friendly prompt when logging in on the terminal (Slave) side to use the peripheral device, and the user waits for the cloud desktop (Master) to release the resources or actively recycle the resources. Meanwhile, if the unique peripheral device such as the camera or the graphics card of the terminal is shared, the unique peripheral device by the terminal (Slave) itself will be affected. Thus, the user may configure the peripheral device as reserved resources as appropriate.

Similarly, if the terminal (Slave) is connected to a peripheral device such as a high-end graphics card, a printer, a professional sound card, a smart card reader and the like, such peripheral device may be directed to the cloud desktop (Master) side in the same manner for the user to use.

It is to be noted that among the modules in FIG. 8, the module 4.1 is a cloud client operated on the terminal, and is configured to establish a link with the cloud protocol serving end on a cloud desktop host, thereby linking with the cloud desk; the module 4.2 is a cloud protocol serving end; the module 4.3 is a desktop virtual machine (VM); the module 4.4 is a PC2 providing the shared peripheral USB device; the module 4.5 is a phone2 providing the shared peripheral camera; the module 4.6 is a PC3 providing the shared peripheral GPU; and the module 4.7 is a cloud desktop management center (the cloud platform management center).

The step S304 involved in the above method may be implemented in the manner described below.

Figure 9:
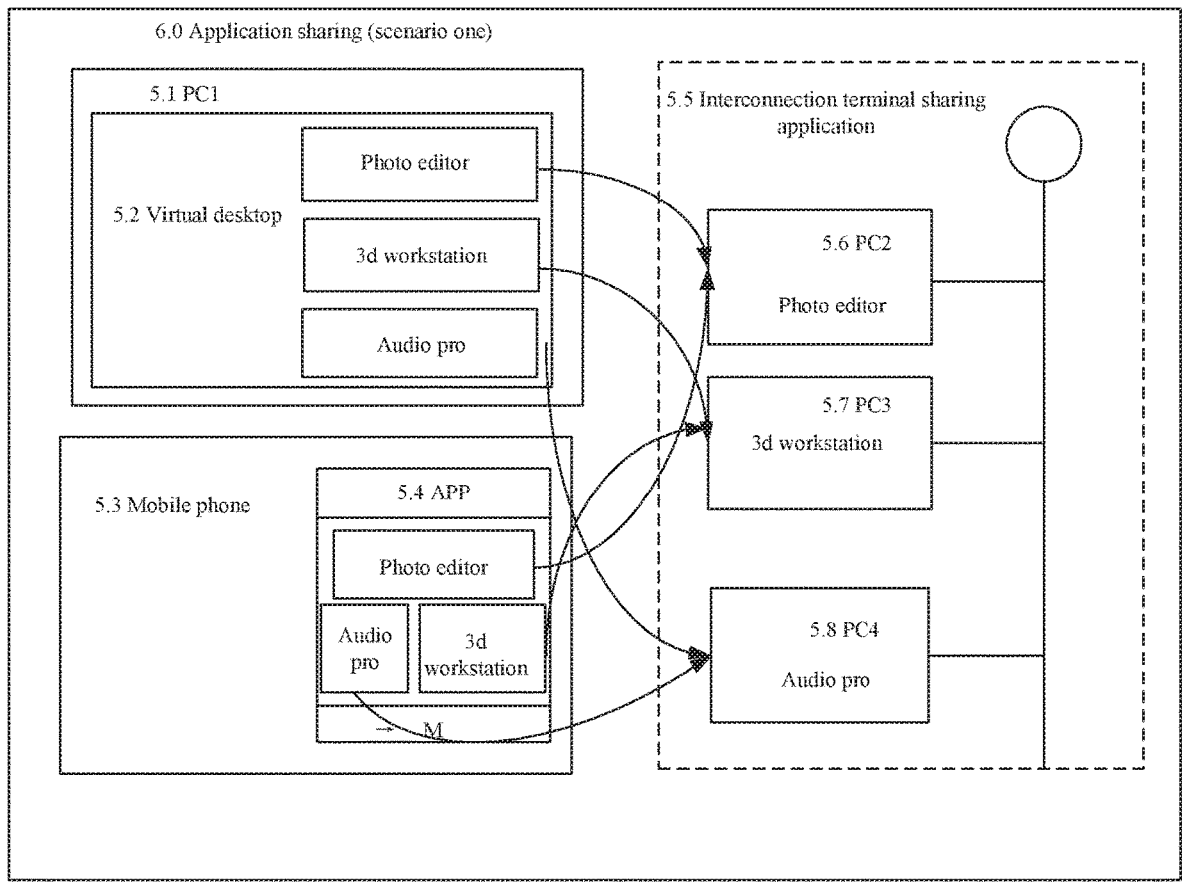
FIG. 9 is a schematic diagram 1 of application sharing according to an embodiment of the present disclosure.

FIG. 9 is a schematic diagram 1 of application sharing according to an embodiment of the present disclosure. As shown in FIG. 9, after PC2 5.6, PC3 5.7, and PC4 5.8 join the interconnection terminal group, a photo editor (PC2 5.6), a 3*d* workstation (PC3 5.7), an audio pro (PC4 5.8) are issued as shared applications. FIG. 9 illustrates a first use mode of the shared applications. After the user logs in the cloud desktop at any terminal, these applications may be seen in the shared application list of the client. After an application is selected to operate, the software operates at the opposite end, i.e., the Slave side, which is very suitable for the multi-terminal cooperative work. If the opening manner is selected as the shared application when the user opens the file, the file will be issued to the native terminal of the shared application and opened for operation.

This manner is substantially different from the processing mode in the related art, such as operating software after changing to another terminal, copying the file and further performing the double-click operation, this method is qualitatively different. Such function also has a better application prospect in public interconnection terminals, such as scenarios of conference preparation, etc.

Meanwhile, a shared application set issued by all terminals in the interconnection terminal group may be presented at a mobile terminal 5.3 in a APP 5.4 mode. After the APP 5.4 is operated, it can be seen that applications included in the shared application set is presented in a modular interface style, the user needs to operate a certain dominant application of a certain terminal to open the file, which may be "remotely controlled" through the APP. In a special scenario, it is easier to trigger the shared application compared with entering into a Windows operating system. An application type may be determined while starting. If the same type of application is provided on the mobile terminal side, the application is able to be started on the mobile terminal side, the operation on the mobile terminal side is synchronized to the PC or the cloud desktop side, and the unfinished work may be finished when the user returns to the PC or the virtual desktop.

It is to be noted that among the modules in FIG. 9, the module 5.1 is a PC1 used by the user logging in the virtual desktop; the module 5.2 is a virtual desktop, enabling the user to find a photo editor from a terminal PC2 5.6, a 3*d* workstation from a terminal PC3 5.7, and an audio pro from a terminal PC4 5.8 in the dominant application list shared by the interconnection terminal group of the client inside the virtual desktop; the module 5.3 is a mobile phone in the user interconnection terminal group; and the module 5.4 is dominant applications shared in the interconnection terminal group representing in an APP form on the mobile terminal, including the photo editor from the terminal PC2 5.6, the 3*d* workstation from the terminal PC3 5.7, and the audio pro from the terminal PC4 5.8; the module 5.6 is the PC2 sharing the photo editor; the module 5.7 is the PC3 sharing the 3*d* workstation; the module 5.8 is the PC4 sharing the audio pro; and the module 5.5 is a terminal of the shared application in the interconnection terminal group. It can be seen from FIG. 5 that the user is able to easily utilize the integrated terminal resources at any terminal, no matter a traditional windows desktop or a lightweight APP application.

However, the cloud desktop user further expects to have the experience of operating the shared application inside the cloud desktop the same as that of operating the application on the native terminal. The processing mode for such scenario is described below in detail.

Figure 10:
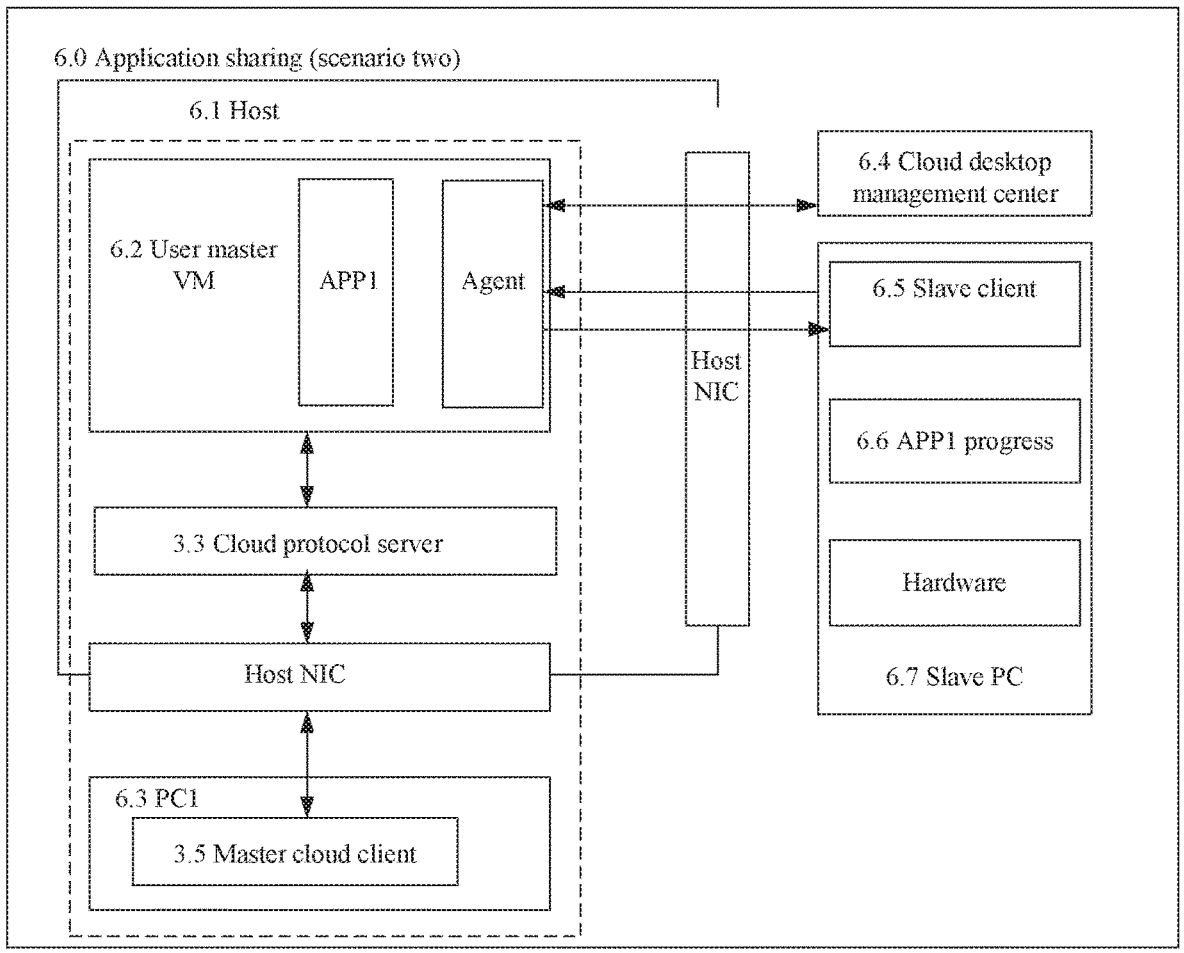
FIG. 10 is a schematic diagram 2 application sharing according to an embodiment of the present disclosure.

FIG. 10 is a schematic diagram 2 of application sharing according to an embodiment of the present disclosure. As shown in FIG. 10, the user visits the cloud desktop on a PC1 6.3. The user clicks to run an application APP1 shared by a terminal 6.0 in a shared application list of a cloud desktop USER Master VM 6.2. Since user data is involved in the interaction, the agent firstly initiates a request to a cloud desktop management center 6.4 to perform relevant compliance determination. The cloud desktop management center 6.4 responds with OK, and the cloud desktop operates the APP1. After the APP1 is operated, human-machine interaction data is transmitted to a native Slave terminal of the application through the agent. The Slave side agent calls the APP1 on the native Slave terminal and further calls hardware of the native terminal to process data transmitted from the cloud desktop (Master) side. After the data is processed, the processing result is returned to an APP1 software interface of the cloud desktop on the cloud desktop side (Master) for display.

If the user logs in the terminal (Slave) and selects to open an application being used by the cloud desktop (Master), a friendly prompt will be provided to inform that the application is being shared to the cloud desktop (Master). The user may wait for the release on the cloud desktop (Master) side, or active recycling.

It is to be noted that among the modules in FIG. 10, the module 6.1 is a host where a cloud desktop virtual machine is located; the module 6.2 is the user cloud desktop virtual machine; the module 6.3 is a terminal used by the user logging in the desktop virtual machine; the module 6.4 is a cloud desktop management center; the module 6.5 is a Slave agent operating on the native terminal of the shared application provided by the interconnection terminal group, and is responsible for interaction with a Master agent; the module 6.6 is a process, which is started when the shared application is operated on the native terminal and is responsible for calling hardware of the native terminal; and the module 6.7 is the native terminal (Slave PC) providing the sharing.

The step S308 involved in the above method may be implemented in the manner described below.

When the user opens a 3D project in the cloud desktop, two use manners for the shared application described in step S306 may be used. However, further considering the user experience and operation intuitiveness, the user may select to sink the application to the terminal used by the currently logged-in cloud desktop to operate.

Figure 11:
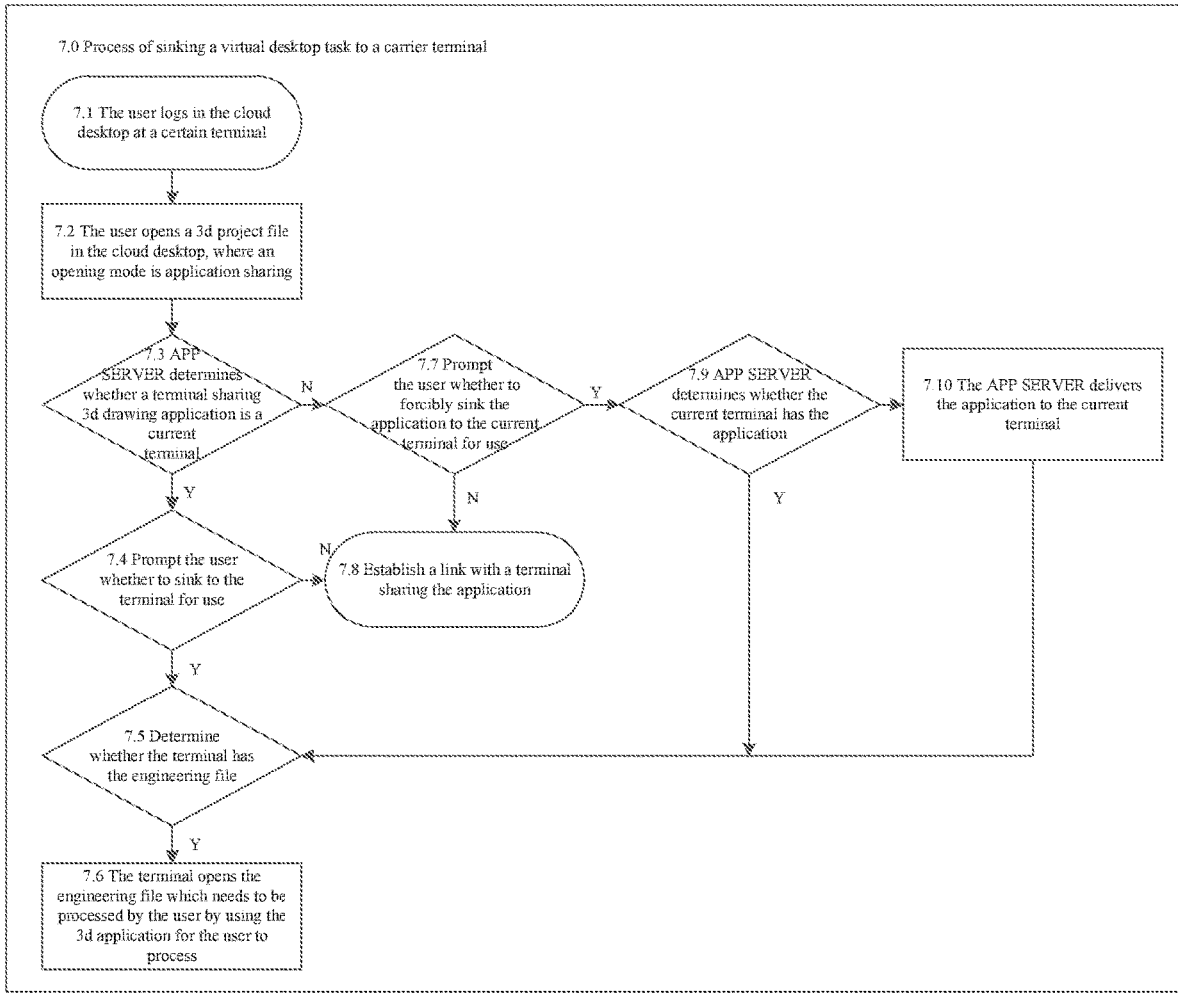
FIG. 11 is a flowchart of a processing of a carrier terminal for a sunken virtual desktop task according to an embodiment of the present disclosure.

FIG. 11 is a flowchart of a processing of a carrier terminal for a sunken virtual desktop task according to an embodiment of the present disclosure. As shown in FIG. 11, the user logs in the cloud desktop at a certain terminal to open a 3D project file. The opening mode is selected to be the application sharing. In this case, an APP SERVER determines the native terminal sharing the application is the terminal used by the user to log in the cloud desktop, and the user selects to sink to the terminal to operate the application. If 3D project file that the user needs to operate does not exists in the terminal, the file is delivered to the terminal through the cloud desktop agent, and is automatically opened after the delivery. If the software has not been installed in the terminal, the APP server automatically delivers and installs the software.

It is to be noted that among the modules in FIG. 11, the module 7.1 represents that the user logs in the cloud desktop at a certain terminal; the module 7.2 represents that the user opens the 3*d* project file in the cloud desktop, and the opening mode is application sharing; the module 7.3 represents that an APP SERVER determines whether a terminal sharing a 3d drawing application is a current terminal; the module 7.4 is to prompt the user whether to sink to the terminal for use; the module 7.5 is to determine whether the terminal has the engineering file; the module 7.6 represents that the terminal opens the engineering file which needs to be processed by the user by using the 3d application for the user to process; the module 7.7 is to prompt the user whether to forcibly sink the application to the current terminal for use; the module 7.8 is to establish a link with a terminal sharing the application; the module 7.9 represents that the APP SERVER determines whether the current terminal has the application; the module 7.10 represents that the APP SERVER delivers the application to the current terminal; and the module 7.11 represents that a terminal agent informs the cloud desktop agent to deliver the file to the terminal.

The step S310 involved in the above method may be implemented in manner described below.

It is to be noted that the public resources include: a public desktop and a public Slave terminal.

Figure 12:
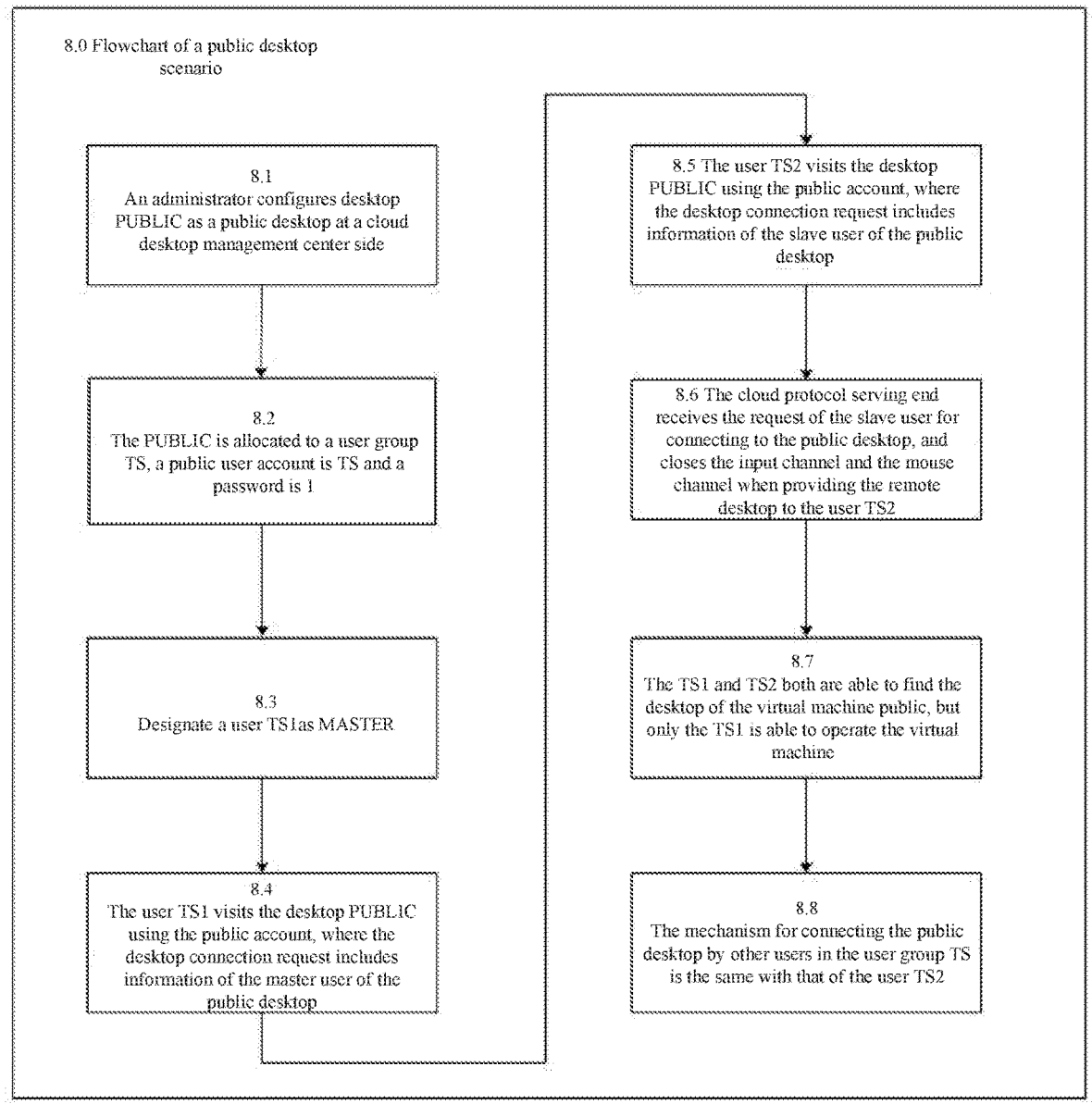
FIG. 12 is a flowchart of a scenario of a public desktop according to an embodiment of the present disclosure.

Firstly, the public desktop is introduced with reference to FIG. 12. FIG. 12 is a flowchart of a scenario of a public desktop according to an embodiment of the present disclosure. As shown in FIG. 12, the public desktop is a desktop PUBLIC configured by an administrator at the cloud desktop management center side. The administrator allocates the PUBLIC to a user group TS, configures a public user account to be TS and the password to be 1, and designates a user TS1 as MASTER. The user TS1 visits the desktop PUBLIC using the public account, and a cloud desktop connection request includes information of a master user of the public desktop. A user TS2 visits the desktop PUBLIC using the public account, and a cloud desktop connection request includes information of a slave user of the public desktop. A cloud protocol serving end receive a request of the slave user for connecting to the public desktop, and closes an input channel and a mouse channel when providing a remote desktop to the user TS2. In this case, the TS1 and TS2 both may find the public desktop of a virtual machine, but only the TS1 is able to operate the virtual machine. The mechanism for connecting the public desktop by other users in the user group TS is the same with that of the user TS2.

It is to be noted that among the modules in FIG. 12, the module 8.1 represents that the administrator configures the desktop PUBLIC as the public desktop at the cloud desktop management center side; the module 8.2 represents that the PUBLIC is allocated to the user group TS, the public user account is TS and the password is 1; the module 8.3 is to designate the user TS1 as MASTER; the module 8.4 represents that the user TS1 visits the desktop PUBLIC using the public account, the desktop connection request includes information of the master user of the public desktop; the module 8.5 represents that the user TS2 visits the desktop PUBLIC using the public account, the desktop connection request includes information of the slave user of the public desktop; the module 8.6 represents that the cloud protocol serving end receives the request of the slave user for connecting to the public desktop, and closes the input channel and the mouse channel when providing the remote desktop to the user TS2; the module 8.7 represents that the TS1 and TS2 both may find the desktop of the virtual machine public, but only the TS1 is able to operate the virtual machine; the module 8.8 represents that the mechanism for connecting the public desktop by other users in the user group TS is the same with that of the user TS2.

Figure 13:
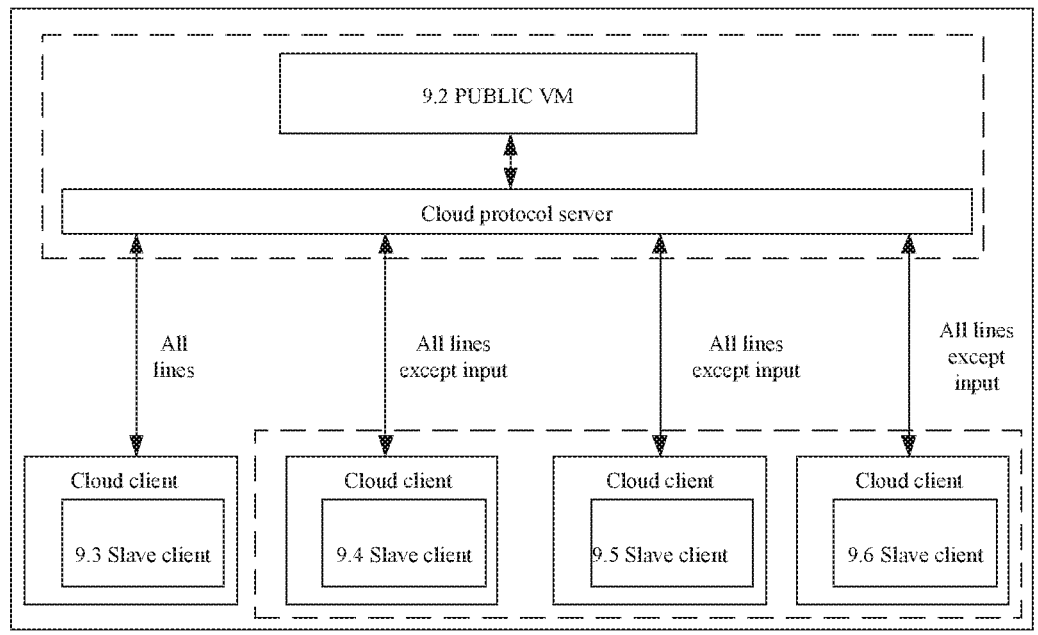
FIG. 13 is a schematic diagram of a usage scenario of a public desktop according to an embodiment of the present disclosure.

FIG. 13 is a schematic diagram of a usage scenario of a public desktop according to an embodiment of the present disclosure. As shown in FIG. 13, the public Slave terminal is a public machine really exists in actual scenes such as a meeting room and a library allowing multiple users to use, or is a terminal with excellent performance in an office area allowing all users in the office area to use. Such terminal may join the interconnection terminal group of each user and act as a public Slave terminal. The Master desktops of the multiple interconnection terminal groups need to queue according to a sequence of link establishment requests.

It is to be noted that among the modules in FIG. 13, the module 9.1 is a host where the Public desktop is located; the module 9.2 is a public desktop virtual machine; the module 9.3 is a MASTER user of the public desktop virtual machine; and the modules 9.4 to 9.7 are Slave users of the public desktop virtual machine.

Figure 14:
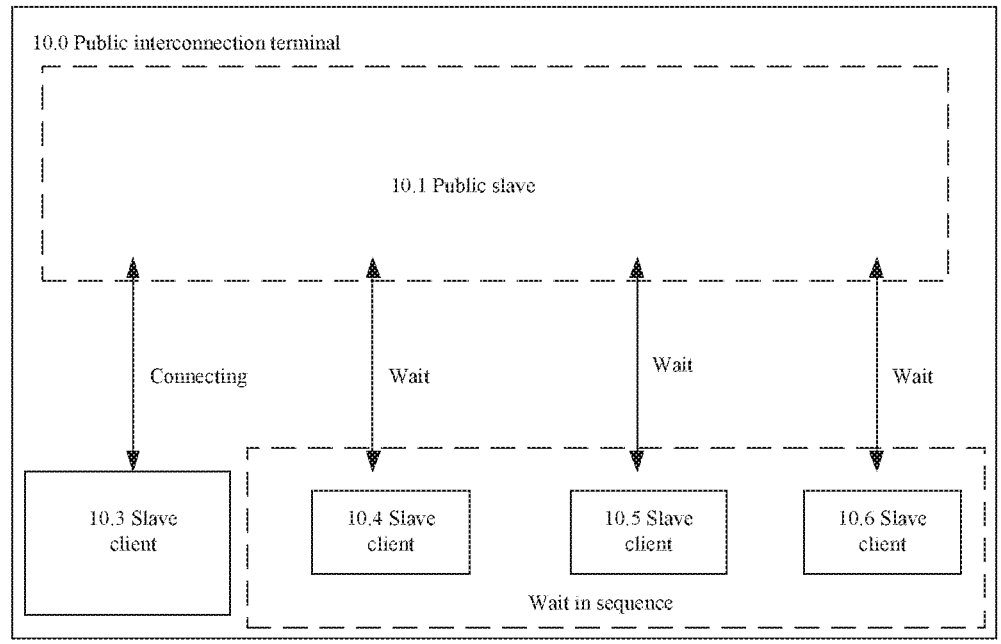
FIG. 14 is a schematic diagram of a public interconnection terminal according to an embodiment of the present disclosure.

FIG. 14 is a schematic diagram of a public interconnection terminal according to an embodiment of the present disclosure. As shown in FIG. 14, the module 10.1 is a public interconnection terminal belonging to multiple interconnection terminal groups; the module 10.3 is a Master cloud desktop of a certain interconnection terminal group, and is also a Master cloud desktop which currently uses shared resources of the public interconnection terminal; the modules 10.4 to 10.6 are master cloud desktops of other interconnection terminal groups, which are queuing for the shared resources of the public interconnection terminal.

Figure 15:
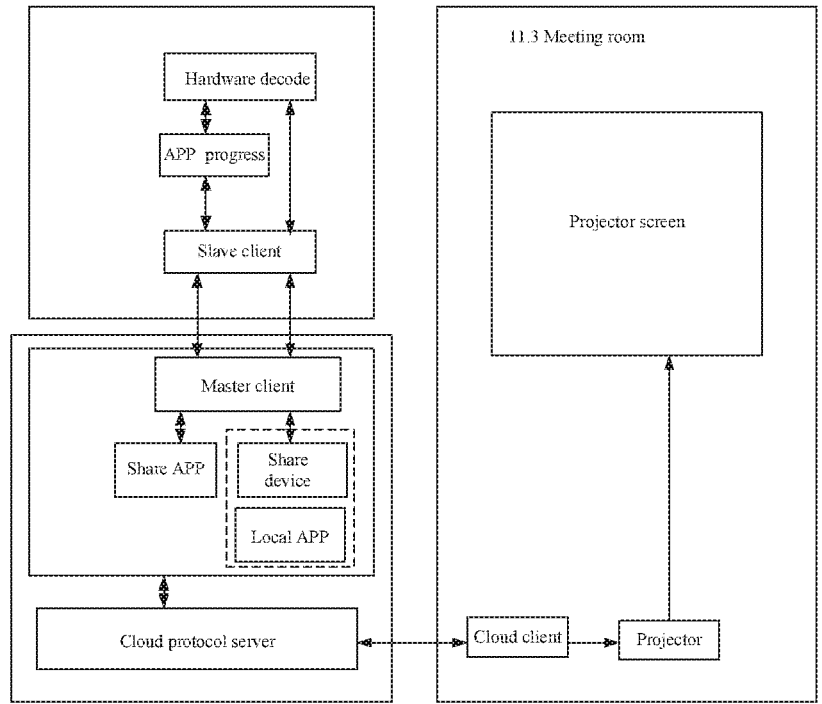
FIG. 15 is a schematic diagram of a scenario of playing a video on a master cloud desktop in a meeting room through a slave terminal in an office area.

FIG. 15 is a schematic diagram of a scenario of playing a video on a master cloud desktop in a meeting room through a slave terminal in an office area. As shown in FIG. 15, the module 11.1 is a PC placed in the office area, which possesses a graphics card with better performance and thus has GPU hardware peripheral devices and related video applications shared in the interconnection terminal group; the module 11.2 is a host where a user cloud desktop is located; the module 11.3 is a meeting room where the user is located. The user logs in the cloud desktop by using a terminal with poor performance in the meeting room. When a high-definition video needs to be played during the conference, the user finds that the PC in the office area in a shared resource list of a cloud desktop client interface shares hardware peripheral devices with good performance and dominant applications at the same time. Through the present disclosure, the user is able to use the PC to play the video in two manners.

(1) The GPU of the PC is redirected. After the redirection succeeds, a player inside the cloud desktop is configured to use a GPU engine of a PC end redirected to the desktop. After the user operates the application to play the video, the interaction between a Master client and a Slave client enables a code stream to be transmitted to the PC end for hard decoding and then is transmitted back to the cloud desktop for display.

(2) The user uses a dominant application shared by the PC side. The user operates the application on the cloud desktop to play the video. In this case, the interaction between the Master client and the Slave client enables interactive data between the application and a bottom layer to be transmitted to the PC end, on which an App Progress calls hardware to process the interactive data, and then is transmitted back to the cloud desktop for display.

Figure 16:
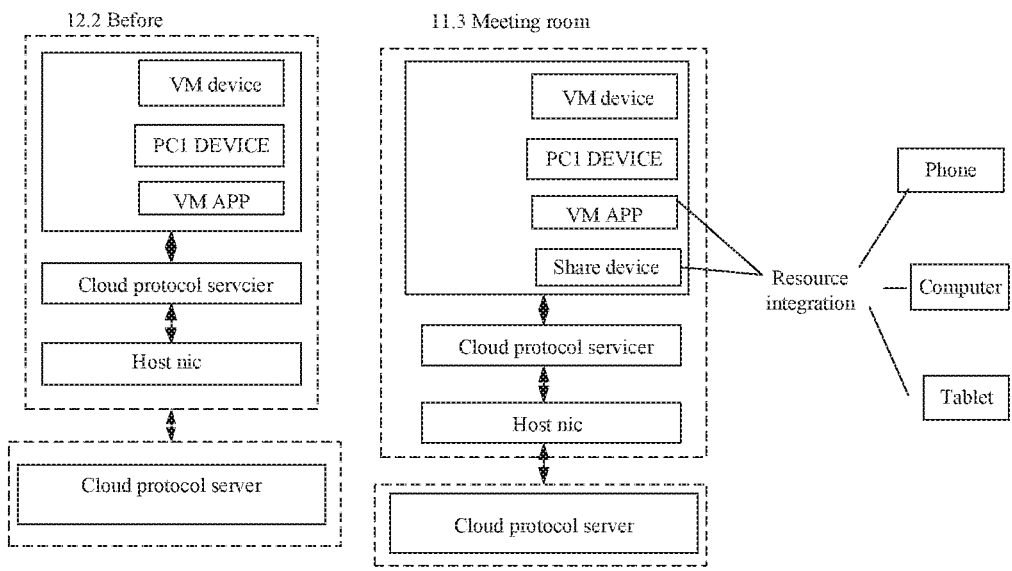
FIG. 16 is a schematic diagram of a comparison before and after a cloud desktop system is applied according to an embodiment of the present disclosure.

FIG. 16 is a schematic diagram of a comparison before and after a cloud desktop system is applied according to an embodiment of the present disclosure. As shown in FIG. 16, the module 12.1 is a traditional cloud desktop; the module 12.2 is a traditional cloud desktop virtual machine in which only the hardware peripheral devices of a native terminal redirected to the virtual machine and applications installed in the cloud desktop are used with incapability of processing a task having a higher requirement on hardware; the module 12.3 is a cloud desktop applying the technology related to the present disclosure; and the module 12.4 is a Master cloud desktop applying the technology related to the present disclosure.

Figure 17:
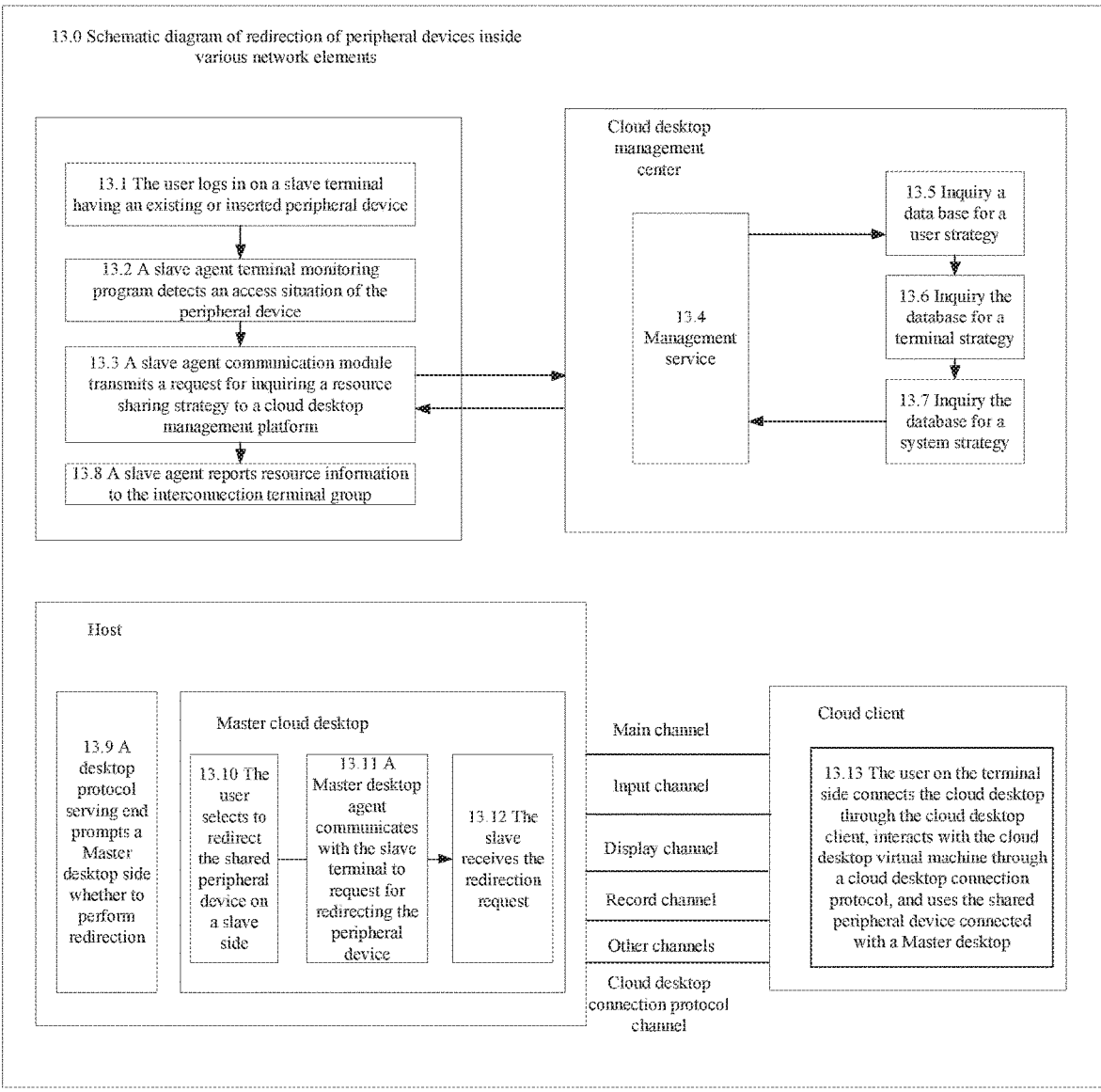
FIG. 17 is a schematic diagram of processing of redirection of peripheral devices inside various network elements according to an embodiment of the present disclosure.

FIG. 17 is a schematic diagram of processing of redirection of peripheral devices inside various network elements according to an embodiment of the present disclosure. As shown in FIG. 17, the module 13.1 represents that the user logs in on a slave terminal having an existing or inserted peripheral device; the module 13.2 represents that a slave agent terminal monitoring program detects an access situation of the peripheral device; the module 13.3 represents that a slave agent communication module transmits a request for inquiring a resource sharing strategy to a cloud desktop management platform; the module 13.4 is a cloud desktop management service; the module 13.5 represents that the cloud desktop management service inquires a database for a user strategy; the module 13.6 represents that the cloud desktop management service inquires the database for a terminal strategy; the module 13.7 represents that the cloud desktop management service inquires the database for a system strategy; the module 13.8 represents that a slave agent reports resource information to the interconnection terminal group; the module 13.9 represents that a desktop protocol serving end prompts a Master desktop side user whether to perform redirection; the module 13.10 represents that the user selects to redirect the shared peripheral device on a slave side; the module 13.11 represents that a Master desktop agent communicates with the slave terminal to request for redirecting the peripheral device; the module 13.12 represents that the slave receives the redirection request; the module 13.13 represents that the user on the terminal side connects the cloud desktop through the cloud desktop client, interacts with the cloud desktop virtual machine through a cloud desktop connection protocol, and uses the shared peripheral device connected with the Master desktop.

Through the embodiment, the cloud desktop system will no longer be limited by hardware, and through resource integration, various types of peripheral devices and applications in the interconnection terminal groups can be visited through the cloud desktop at any time and any place, the practicability and the usability are greatly improved.

The embodiment of the present disclosure further provides a storage medium. In the embodiment, the storage medium may be configured to store program codes for performing steps described below.

In step S1, links with multiple terminals are established.

In step S2, resources of the multiple terminals are acquired through the links, and the acquired resources are shared to the multiple terminals respectively.

In this embodiment, the storage medium may include, but is not limited to, a USB flash disk, a read-only memory (ROM), a random access memory (RAM), a mobile hard disk, a magnetic disk, an optical disk or another medium capable of storing program codes.

For specific examples in this embodiment, reference may be made to the examples described in the above-mentioned embodiments and optional embodiments, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only some embodiments of the present disclosure and are not intended to limit the present disclosure. For those skilled in the art, the present disclosure may have various modifications and variations. Any modifications, equivalent substitutions, improvements made within the spirit and principle of the present disclosure should fall within the scope of the present disclosure.

INDUSTRIAL APPLICABILITY

Through embodiments of the present disclosure, the cloud desk system may establish the links with the multiple terminals, and acquire the resources of the multiple terminals and share the acquired resources to the multiple terminals, thereby implementing resource sharing among the multiple terminals. In other words, one terminal may implement using resources of other terminals. This solves the problem in the related art that when the current terminal cannot process a file or task, the user needs to move to another terminal to complete the processing, and thus improves the effect of user experience.

What is claimed is:
1. A resource sharing method, comprising:
establishing, by a cloud desktop system based on a virtual desktop infrastructure (VDI), links with a plurality of terminals; and
acquiring, by the cloud desktop system, resources of the plurality of terminals through the links, and sharing the acquired resources to the plurality of terminals;
wherein establishing, by the cloud desktop system, links with the plurality of terminals comprises:
receiving, by the cloud desktop system, login requests transmitted by the plurality of terminals through respective cloud desktop clients; and
after the plurality of terminals log into the cloud desktop system through the cloud desktop clients, establishing, by the cloud desktop system, the links between the cloud desktop system and the plurality of terminals,
wherein login requests carry identification information of the terminals;
wherein after the cloud desktop system receives the login requests transmitted by the plurality of terminals through the cloud desktop clients, the method further comprises:
grouping, by the cloud desktop system, the plurality of terminals according to the identification information;
wherein establishing, by the cloud desktop system, the links between the cloud desktop and the plurality of terminals comprises:
establishing, by the cloud desktop system, the links with the grouped terminals according to the login requests, wherein acquiring, by the cloud desktop system, the resources of the plurality of terminals through the links, and sharing the acquired resources to the plurality of terminals comprise:

receiving, by the cloud desktop system, resources reported by the plurality of the grouped terminals through the links; and sharing, by the cloud desktop system, resources received from each terminal group to terminals in the each terminal group, or sharing the received resources to all terminals.

2. The method of claim 1, wherein after sharing the acquired resources to the plurality of terminals respectively, the method further comprises: configuring, by the cloud desktop system, a public cloud desktop, and sharing the public cloud desktop to the plurality of terminals, selecting, by the cloud desktop system, a terminal from the plurality of terminals, authorizing the selected terminal to operate the public desktop, and forbidding the rest of the plurality of terminals to operate the public cloud desktop.

3. The method of claim 1, wherein after sharing the acquired resources to the plurality of terminals, the method further comprises: selecting, by the cloud desktop system, a terminal as a public cloud desktop from the plurality of terminals; and configuring, by the cloud desktop system, the public cloud desktop to be a terminal shared by the rest of the plurality of terminals.

4. A resource sharing method, comprising:

establishing, by a terminal, a link with a cloud desktop system based on a virtual desktop infrastructure (VDI);

reporting, by the terminal, resources to the cloud desktop system through the link; and receiving, by the terminal, resources shared from the cloud desktop system, wherein the shared resources comprise all resources reported by a plurality of terminals;

wherein establishing, by the terminal, the link with the cloud desktop system based on the VDI comprises:

transmitting, by the terminal, a login request to the cloud desktop system through a cloud desktop client on the terminal; and after the terminal logs into the cloud desktop system through the cloud desktop client, establishing, by the terminal, the link with the cloud desktop system, wherein the login request carries identification information of the terminal, wherein in a case where the resources are peripheral device resources of the terminals, acquiring, by the cloud desktop system, the resources of the plurality of terminals through the links, and sharing the acquired resources to the plurality of terminals respectively comprise:

receiving, by the cloud desktop system, the peripheral device resources reported by the plurality of terminals through the links;

determining, by the cloud desktop system, whether the peripheral device resources are allowed to be shared;

in response to determining that the peripheral device resources are allowed to be shared, sharing, by the cloud desktop system, the peripheral device resources to the cloud desktop clients of the plurality of terminals;

redirecting, by the cloud desktop system, the peripheral device resources shared to the cloud desktop clients of the plurality of terminals; and loading, by the cloud desktop system, the redirected peripheral device resources into the cloud desktop system.

5. A resource sharing device, applied to a cloud desktop system based on a virtual desktop infrastructure (VDI), comprising: a processor; and a memory, which is configured to store instructions executable by the processor, wherein the processor is configured to implement the resource sharing method of claim 1.

6. The device of claim 5, wherein the login requests carry identification information of the terminals; the processor is further configured to: after receiving the login requests transmitted by the plurality of terminals through respective cloud desktop clients, group the plurality of terminals according to the identification information; and establish the links with the grouped terminals according to the login requests, wherein the processor is specifically configured to: receive resources reported by the grouped terminals through the links; and share resources received from each terminal group to terminals in the each terminal group, or share the received resources to all terminals.

7. The device of claim 5, wherein in a case where the resources are peripheral device resources of the terminals, the processor is specifically configured to: receive the peripheral device resources reported by the terminals through the links; determine whether the peripheral device resources are allowed to be shared; in a case where the peripheral device resources are allowed to be shared, share the peripheral device resources to the cloud desktop clients of the plurality of terminals; redirect the peripheral device resources shared to the cloud desktop clients of the plurality of terminals; and the redirected peripheral device resources onto the cloud desktop system.

8. The device of claim 5, wherein in response to determining that the resources are application resources of the terminals, the processor is specifically configured to: in response to determining that a currently operated terminal is a native terminal of currently operated application resources, trigger the native terminal of the currently operated application resources to operate the currently operated application resources and return an operation on the currently operated application resources for display; or acquire data of the application resources or a program executing the application resources from the native terminal, deliver the acquired data or program to a terminal currently operated, and trigger the terminal currently operated according to the data or the program to operate the application resources currently operated.

9. The device of claim 5, wherein the processor is further configured to: after sharing the acquired resources to the plurality of terminals, configure a public cloud desktop and share the public cloud desktop to the plurality of terminals; and select a terminal from the plurality of terminals, authorize the selected terminal to operate the public desktop, and forbid the rest of the plurality of terminals to operate the public cloud desktop.

10. The device of claim 5, wherein the processor is further configured to: after sharing the acquired resources to the plurality of terminals, select a terminal to be a public cloud desktop; and configure the public cloud desktop to be a terminal shared by the rest of the plurality of terminals.

11. A cloud desktop system, comprising:
a processor;
a memory, which is configured to store instructions executable by the processor;

a transmission apparatus, which is configured to perform information transceiving communication according to control of the processor;

wherein the processor is configured to:
control the transmission apparatus to establish links with a plurality of terminals; and
acquire resources of the plurality of terminals through the transmission apparatus, and share the acquired resources to the plurality of terminals;
wherein the processor is further configured to:
receive login requests transmitted by cloud desktop clients of the plurality of terminals through the transmission apparatus; and
after the plurality of terminals log into the cloud desktop system through the cloud desktop clients, establish links between the cloud desktop system and the plurality of terminals, wherein in a case where the resources are application resources of the terminals, acquiring, by the cloud desktop system, the resources of the plurality of terminals through the links, and sharing the acquired resources to the plurality of terminals respectively comprise:
in response to determining that a currently operated terminal is a native terminal of currently operated application resources, triggering, by the cloud desktop system, the native terminal of the currently operated application resources to operate the currently operated application resources and return an operation on the currently operated application resources for display; or
acquiring, by the cloud desktop system, data of the application resources or a program executing the application resources from the native terminal, delivering the acquired data or program to a terminal currently operated, triggering the terminal currently operated according to the data or the program to operate the application resources currently operated.

12. A resource sharing device, applied to a terminal and comprising: a processor; and a memory, which is configured to store instructions executable by the processor, wherein the processor is configured to implement the resource sharing method of claim 4.

13. A terminal, comprising: a processor; a memory, which is configured to store instructions executable by the processor; a transmission apparatus, which is configured to perform information transceiving communication according to control of the processor; wherein the processor is configured to implement resource sharing method of claim 4.

14. A non-transitory storage medium, comprising stored programs which, while executed, perform the method of claim 1.

* * * * *

UNITED STATES PATENT AND TRADEMARK OFFICE
CERTIFICATE OF CORRECTION

| | | |
|---|---|---|
| PATENT NO. | : 11,363,092 B2 | Page 1 of 1 |
| APPLICATION NO. | : 16/465394 | |
| DATED | : June 14, 2022 | |
| INVENTOR(S) | : Li et al. | |

It is certified that error appears in the above-identified patent and that said Letters Patent is hereby corrected as shown below:

In the Drawings

Sheet 12 of 13 (FIG. 16), Line 5 (approx.), delete "servcier" and insert -- servicer --.

In the Specification

Column 18, Line 33-34, delete "This solves the problem in the related art that" and insert -- In this way, --.

Column 18, Line 36-37, delete "processing, and thus improves the" and insert -- processing. The --.

Column 18, Line 37, delete "experience." and insert -- experience is thus improved. --.

Signed and Sealed this
Eleventh Day of October, 2022

Katherine Kelly Vidal
*Director of the United States Patent and Trademark Office*